March 13, 1934.    H. E. MUSSELMAN    1,950,994
WHEEL ALIGNMENT TESTING DEVICE
Filed March 2, 1931    3 Sheets-Sheet 1
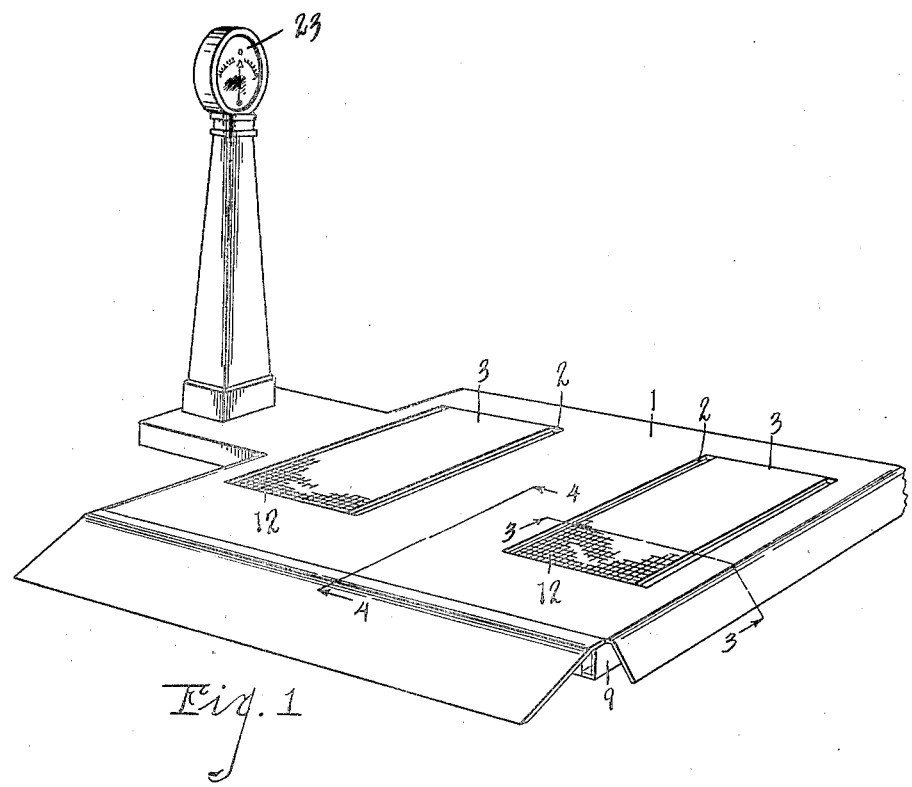
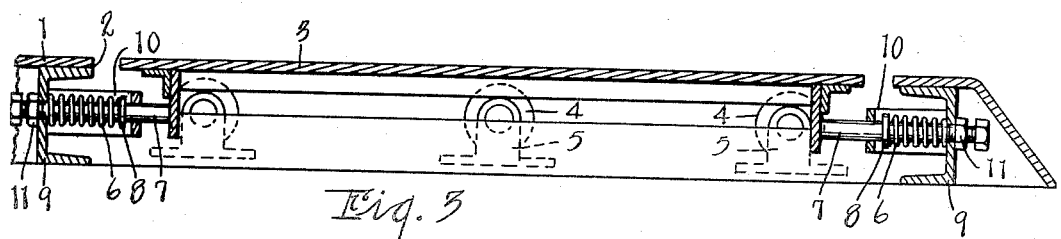
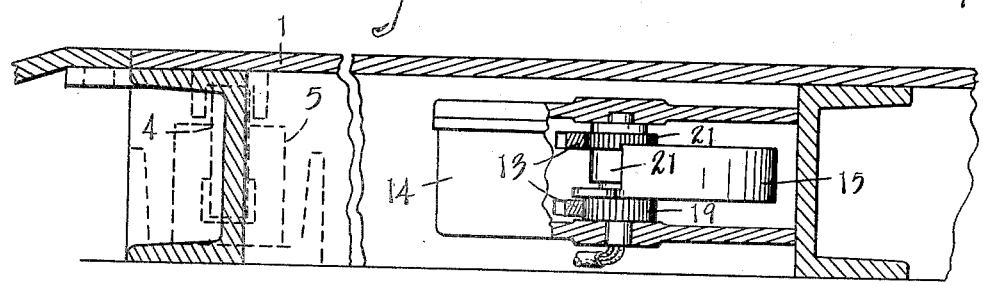
INVENTOR
Henry E. Musselman
BY
Chappell & Earl
ATTORNEYS March 13, 1934.    H. E. MUSSELMAN    1,950,994
WHEEL ALIGNMENT TESTING DEVICE
Filed March 2, 1931    3 Sheets-Sheet 2
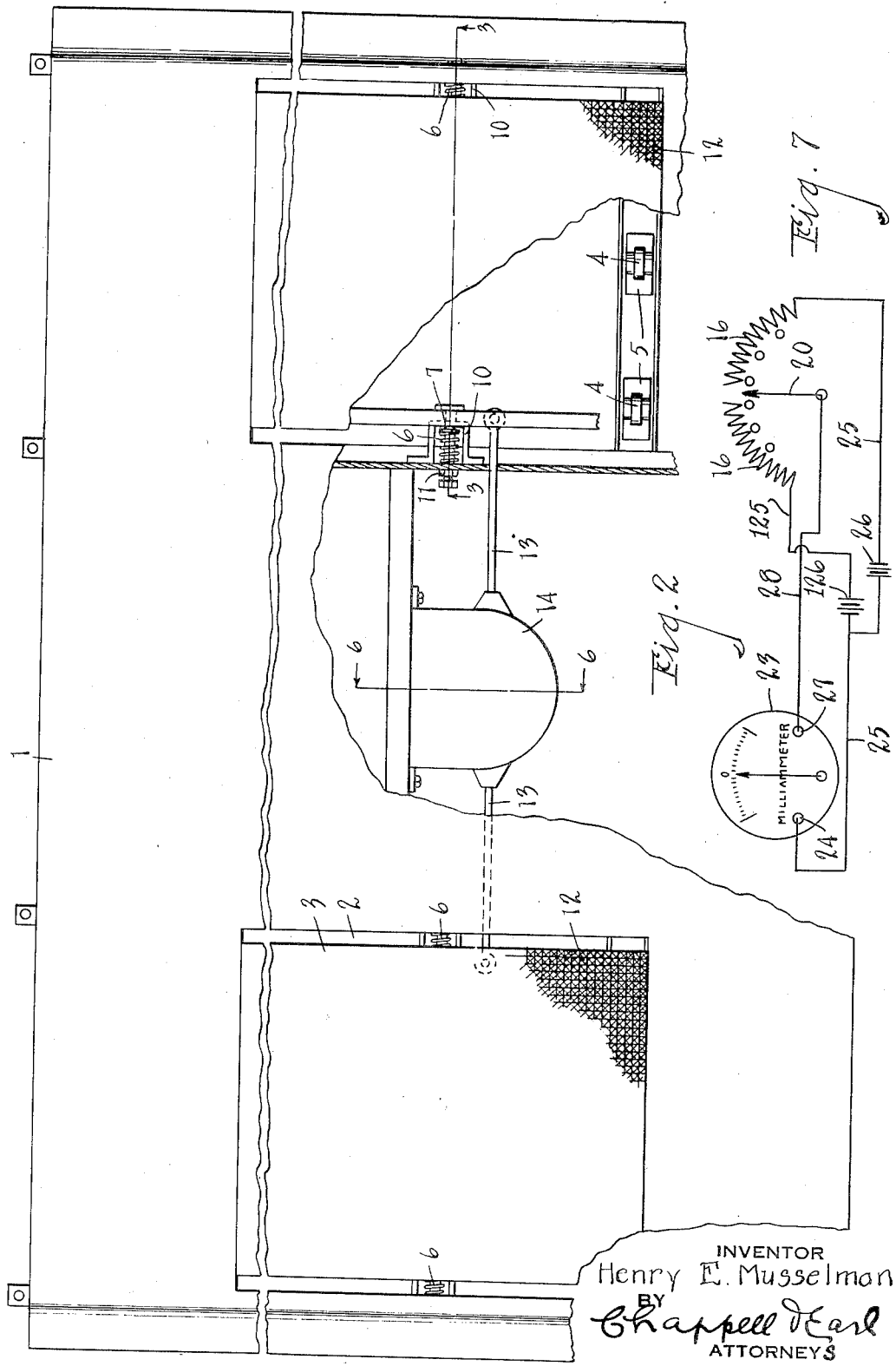
INVENTOR
Henry E. Musselman
BY
Chappell & Earl
ATTORNEYS March 13, 1934.  H. E. MUSSELMAN  1,950,994
WHEEL ALIGNMENT TESTING DEVICE
Filed March 2, 1931  3 Sheets-Sheet 3
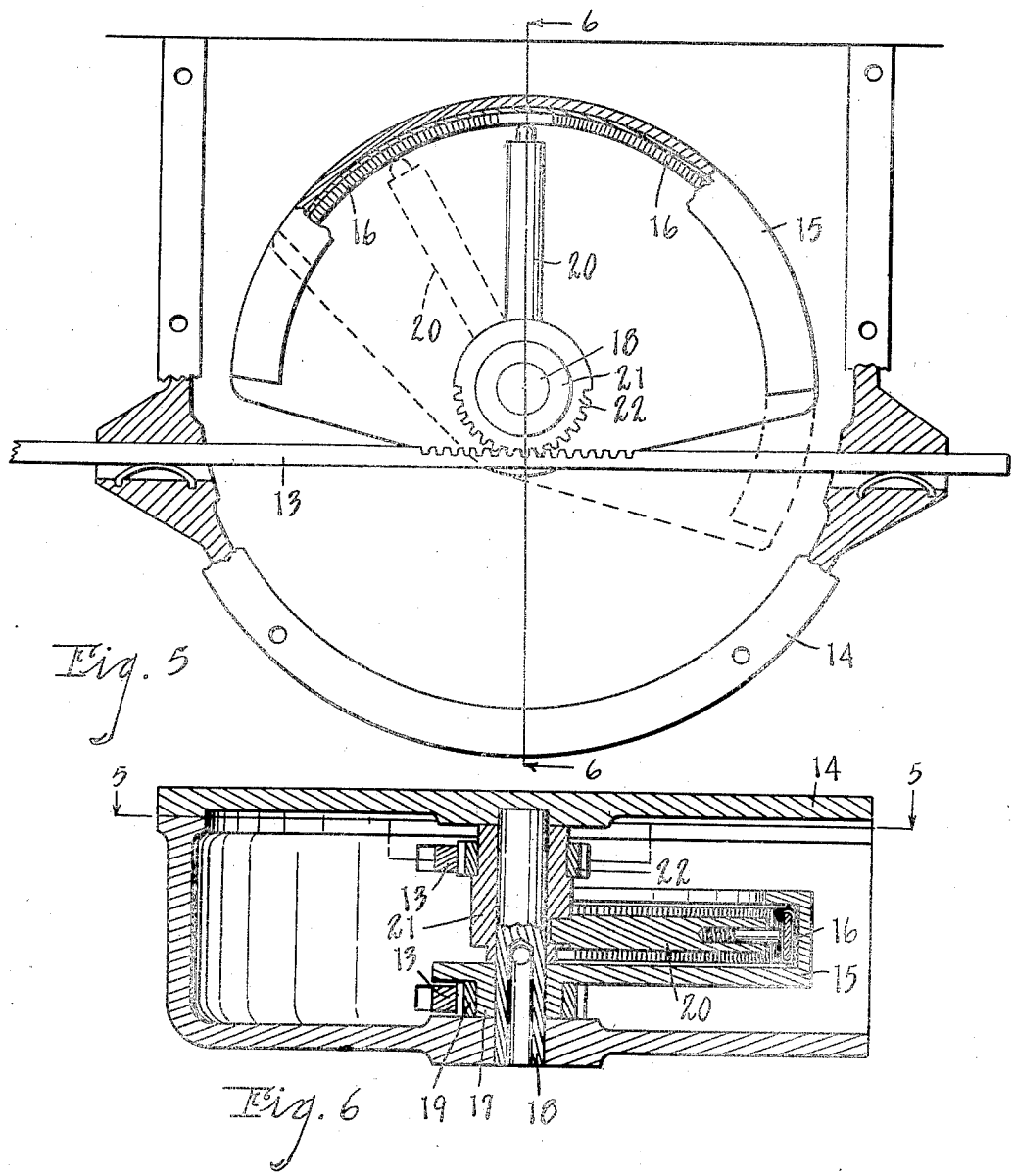
INVENTOR
Henry E. Musselman
BY
Chappell DeArl
ATTORNEYS Patented Mar. 13, 1934

1,950,994

UNITED STATES PATENT OFFICE 1,950,994

WHEEL ALIGNMENT TESTING DEVICE

Henry E. Musselman, Kalamazoo, Mich., assignor to Atlas Press Company, Kalamazoo, Mich.

Application March 2, 1931, Serial No. 519,302

13 Claims. (Cl. 177—311)

The main object of this invention is to provide a wheel alignment testing device for motor vehicles which permits rapid and easy determination of the alignment of wheels of motor vehicles.

Objects relating to details and economies of my invention will appear from the description to follow. The invention is defined and pointed out in the claims.

A structure which is a preferred embodiment of my invention is illustrated in the accompanying drawings, in which:

Fig. 1 is a perspective view of my improved wheel alignment testing machine or apparatus.

Fig. 2 is a fragmentary plan view.

Fig. 3 is an enlarged fragmentary view mainly in section on line 3—3 of Figs. 1 and 2.

Fig. 4 is an enlarged fragmentary view partially in section on line 4—4 of Fig. 1.

Fig. 5 is an enlarged fragmentary view partially in section on line 5—5 of Fig. 6.

Fig. 6 is an enlarged fragmentary view mainly in section on line 6—6 of Figs. 2 and 5.

Fig. 7 is a diagrammatic wiring diagram of the rheostat and milliammeter.

In the embodiment of my invention illustrated, I provide a platform 1 upon which at least the front wheels of a motor vehicle may be driven. This platform has spaced openings 2 in the top thereof in which the wheel supporting plates 3 are mounted for lateral floating movement. These plates are supported by the rollers 4 arranged in suitable supporting brackets 5.

The plates are yieldingly held in a central position by means of the coiled buffer springs 6 arranged in opposed relation; that is, on opposite sides of the wheel supporting plates. These springs are mounted on the buffer rods 7 to engage the collars 8 thereon, the rods being arranged through the bed pieces 9, the rods being slidably supported in the yoke-shaped brackets 10 and the bed pieces. The rods have adjustable stops 11 engaging the bed pieces to properly position the plates.

With this arrangement, the plates are held yieldingly in a central normal position but are free to float laterally in either direction under the action of a vehicle wheel driven thereon which may be out of alignment. The wheels out of alignment tend to cause friction between the wheels driven over the plate and the plate thereby moving the plate laterally. The surfaces of the plates are preferably roughened as indicated at 12 to increase the friction.

Each plate has a rack bar 13 secured thereto, this rack bar projecting into a housing 14 mounted between the wheel or traction plates.

Within this housing I mount a rheostat device comprising a pivoted resistance element carrying member 15 in which the resistance elements 16 are mounted, these resistance elements being curved or segment-shaped.

The support member 15 has a hub portion 17 mounted on the journal pin 18, the hub having a pinion 19 thereon meshing with one of the racks 13. A contact member 20 is provided with a hub 21 on the pin 18, the hub having a pinion 22 coacting with the other rack so that when the tread plates to which these members are connected are shifted in either direction from their central neutral point, the rheostat element to which they are connected is oscillated or moved in relation to the coacting rheostat element.

To indicate the direction of movement, I provide an electrical indicator such as a milliammeter shown conventionally at 23 in the drawings, one post as 24 of this milliammeter being connected by the wires indicated at 25 and 125 to the resistance elements 16, a source of electrical supply indicated at 26 and 126 being introduced in this connection. The other post 27 of the milliammeter is connected by the wire indicated at 28 to the contact member of the rheostat. The source of electrical supply 26 is in the circuit with one resistance element, wire 25, and the contact member 20. This source of electrical energy 26 is adapted to cause a flow of current through the ammeter 23 in one direction to cause deflection of the needle of said ammeter to one side of its neutral position. The source of electrical supply 126 is in a circuit with the other resistance element, wire 125 and contact 20, and is adapted to cause a flow of current through the ammeter 23 in the opposite direction from that caused by the source 26. This causes a deflection of the needle by the ammeter 23 to the other side of its neutral position. It will be seen that the differential movement of the resistance element carrying member 15 and the contacting element 20 will be in opposite directions, depending upon whether the wheels passing over the apparatus are toed in or toed out. This difference in direction will determine which of the resistance elements 16 is thrown into circuit with the ammeter.

The arrangement here described will thus cause the needle of the ammeter 23 to be deflected to one side for toe in of the wheels and to the other side for toe out.

With this arrangement, the floating movement of the tread plates resulting from the action of wheels that are out of alignment thereon is indicated on the milliammeter.

In the event that a driver drives upon the tread plates at an angle, both of the rheostat members will move in the same direction, thereby compensating for such angle, but in the event the wheels are out of alignment, this is indicated on the milliammeter notwithstanding that the wheels have been driven on the tread plates at an angle, the indication being the same as if they had been driven on straight owing to the fact that the rheostat members may swing freely in either direction.

I have illustrated and described my improvements in an embodiment which I have found highly practical. I have not attempted to illustrate and describe certain other embodiments and adaptations which I contemplate as it is believed that this disclosure will enable those skilled in the art to embody or adapt my improvements as may be desired.

Having thus described my invention, what I claim as new and desire to secure by Letters Patent, is:

1. In a wheel alignment testing apparatus, the combination of a platform having spaced openings therein, wheel plates means supporting said plates in said openings for lateral floating movement to and from each other, said wheel plates being provided with supporting rollers, springs acting to yieldingly hold each of said plates in a central position, a rack bar connected to each of said plates, a rheostat comprising a pair of resistance elements and a pivoted support therefor having a pinion coacting with one of said racks, and a pivoted contact member adapted to selectively contact with said resistance elements and provided with a pinion coacting with the other of said racks, the resistance element selected depending upon the direction of relative displacement of the plates, the relative movement of the contact on the resistance element being proportional to the relative plate displacement, and an ammeter operatively associated in selective series circuit relationship with each of said resistance elements and said contact element and means for energizing the circuit, the ammeter indicating the direction of and measuring the displacement of the plates.

2. In a wheel alignment testing apparatus, the combination of a platform having spaced openings therein, wheel plates means supporting said plates in said openings for lateral floating movement to and from each other, a rack bar connected to each of said plates, a rheostat comprising a pair of resistance elements and a pivoted support therefor having a pinion coacting with one of said racks, and a pivoted contact member adapted to selectively contact with said resistance elements and provided with a pinion coacting with the other of said racks, the resistance element selected depending upon the direction of relative displacement of the plates, the relative movement of the contact on the resistance element being proportional to the relative plate displacement, and an ammeter operatively associated in selective series circuit relationship with each of said resistance elements and said contact element and means for energizing the circuit, the ammeter indicating the direction of and measuring the displacement of the plates.

3. In a wheel alignment testing apparatus, the combination of a platform having spaced openings therein, wheel supporting plates means supporting said plates in said openings for lateral floating movement to and from each other, said wheel plates being provided with supporting rollers, springs acting to yieldingly hold each of said plates in initial neutral position, a rheostat comprising a plurality of resistance elements and a movable support therefor, a movable contact member adapted to selectively contact with said resistance elements, operating connections for said resistance element support to one of said wheel supporting plates and for the other wheel supporting plate to said contact member, the resistance element selected depending upon the direction of relative displacement of the plates, the relative movement of the contact on the resistance element being proportional to the relative plate displacement, and an electrical indicator operatively connected to said rheostat in selective series circuit relationship with said resistance elements and means for energizing the circuit, the indicator indicating the direction of and measuring the displacement of the plates.

4. In a wheel alignment testing apparatus, the combination of a platform having spaced openings therein, wheel supporting plates means supporting said plates in said openings for lateral floating movement to and from each other, springs acting to yieldingly hold each of said plates in initial neutral position, a rheostat comprising a plurality of resistance elements and a movable support therefor, a movable contact member adapted to selectively contact with said resistance elements, operating connections for said resistance element support to one of said wheel supporting plates and for the other wheel supporting plate to said contact member, the resistance element selected depending upon the direction of relative displacement of the plates, the relative movement of the contact on the resistance element being proportional to the relative plate displacement, and an electrical indicator operatively connected to said rheostat in selective series circuit relationship with said resistance elements and means for energizing the circuit, the indicator indicating the direction of and measuring the displacement of the plates.

5. In a wheel alignment testing apparatus, the combination of a platform having spaced openings therein, wheel supporting plates means supporting said plates in said openings for lateral floating movement to and from each other, a rheostat comprising a plurality of resistance elements and a movable support therefor, a movable contact member adapted to selectively contact with said resistance elements, operating connections for said resistance element support to one of said wheel supporting plates and for the other wheel supporting plate to said contact member, the resistance element selected depending upon the direction of relative displacement of the plates, the relative movement of the contact on the resistance element being proportional to the relative plate displacement, and an electrical indicator operatively connected to said rheostat in selective series circuit relationship with said resistance elements and means for energizing the circuit, the indicator indicating the direction of and measuring the displacement of the plates.

6. In an apparatus of the class described, the combination of a pair of wheel supporting plates, means supporting said plates for movement to and from each other, means acting to yieldingly hold said plates in a central position, a rheostat comprising a pair of resistance elements provided with a movable supporting member, a movable contact member adapted to selectively contact with said resistance elements, operating connections for said contact member to one of said wheel supporting plates, operating connections from said resistance element support to the other of said wheel supporting plates, the resistance element selected depending upon the direction of relative displacement of the plates, the relative movement of the contact on the resistance element being proportional to the relative plate displacement, and an electrical indicator operatively connected to said rheostat in selective series circuit relationship with said resistance elements and means for energizing the circuit, the indicator indicating the direction of and measuring the displacement of the plates.

7. In an apparatus of the class described, the combination of a pair of wheel supporting plates, means supporting said plates for movement to and from each other, a rheostat comprising a pair of resistance elements provided with a movable supporting member, a movable contact member adapted to selectively contact with said resistance elements, operating connections for said contact member to one of said wheel supporting plates, operating connections from said resistance element support to the other of said wheel supporting plates, the resistance element selected depending upon the direction of relative displacement of the plates, the relative movement of the contact on the resistance element being proportional to the relative plate displacement, and an electrical indicator operatively connected to said rheostat in selective series circuit relationship with said resistance elements and means for energizing the circuit, the indicator indicating the direction of and measuring the displacement of the plates.

8. In an apparatus of the class described, the combination of a pair of tread plates, means supporting said plates for movement in a straight line to and away from and independently of each other in the same plane, means acting to yieldingly hold said plates in a neutral position, a rheostat comprising a pair of coacting elements movable independently of each other and in either of two directions from a neutral point, one of said rheostat members being connected to one of said tread plates and the other to the other tread plate, the selected direction depending upon the direction of relative displacement of the plates, the relative displacement of the coacting elements being proportional to the relative plate displacement, and an electrical indicator operatively associated in series circuit relationship with said rheostat members and means for energizing the circuit, the indicator indicating the direction of and measuring the displacement of the plates.

9. In an apparatus of the class described, the combination of a pair of tread plates, means supporting said plates for movement in a straight line to and away from and independently of each other in the same plane, means acting to yieldingly hold said plates in a neutral position, an electrical indicator means, and a control therefor comprising a pair of coacting elements movable independently of each other in either of two directions from a neutral point, means connecting one of said coacting elements to one of said tread plates and the other coacting element to the other tread plate, whereby said coacting elements are moved relative to one another proportionately to the relative movement of said plates to and from each other and a source of electrical energy in series circuit relationship with said indicator means and said control, the indicator means indicating the direction of and measuring the displacement of the plates.

10. In an apparatus of the class described, a pair of wheel supporting plates, means supporting said plates for movement to and from each other, a rheostat comprising a plurality of resistance varying devices with a movable supporting member, a movable contact member common to and adapted to selectively operate in said resistance changing devices, operating connections for said supporting member to one of said wheel supporting plates, an operating connection from said contact member to the other of said wheel supporting plates, the resistance varying device selected depending upon the direction of relative displacement of the plates, the relative movement of the contact on the resistance varying device being proportional to the relative plate displacement, a source of electrical energy in series circuit relationship with said rheostat, and means for measuring the current in the circuit for indicating the direction and degree of displacement of the plates.

11. In a wheel alignment testing device, the combination of a pair of wheel supporting plates, means supporting said plates for movement in a straight line to and away from and independently of each other in the same plane, and a resistance varying device comprising a resistance element and a contacting element in operative relationship, means supporting said elements for movement independently of each other, operating connections from one of said plates to said resistance element, and operating means from the other of said plates to said contacting element, whereby said resistance element and said contacting element are moved relatively to one another by relative movement of said plates to and from each other, a source of electrical energy in series circuit relationship with said resistance varying device, and means for measuring the current flowing in the circuit.

12. In an apparatus of the class described, the combination of a pair of wheel supporting plates, means supporting said plates for movement in a straight line to and away from and independently of each other in the same plane, a rheostat comprising a pair of resistance elements provided with a movable supporting member, a movable contact member adapted to selectively contact with said resistance elements, operating connections for said contact member to one of said wheel supporting plates, operating connections from said resistance element support to the other of said wheel supporting plates, whereby said resistance element and said contacting element are moved relatively to one another by relative movement of said plates to and from each other, the resistance element and contact moving a distance depending on the degree of displacement of the plates, an electrical indicator operatively connected to said rheostat in selective series circuit relationship with each of said resistance elements, means for causing a flow of current through said indicator when it is in circuit with one of said resistance elements, and for causing a flow of current in the opposite direction through said indicator when it is in circuit with the other of said resistance elements.

13. In an apparatus of the class described, the combination of a pair of wheel supporting plates, means supporting said plates for relative lateral movement, a rheostat comprising a pair of resistance elements provided with a movable supporting member, a movable contact member adapted to selectively contact with said resistance elements, operating connections for said contact member to one of said wheel supporting plates, operating connections from said resistance element support to the other of said wheel supporting plates, whereby said resistance element and said contacting element are moved relatively to one another by relative movement of said plates to and from each other, an electrical indicator operatively connected to said rheostat in selected series circuit relationship with each of said resistance elements, means for causing a flow of current through said indicator when it is in circuit with one of said resistance elements and for causing a flow of current in the opposite direction through said indicator when it is in circuit with the other of said resistance elements, the indicator measuring the degree of displacement of the wheels as well as the direction of displacement.

HENRY E. MUSSELMAN.